United States Patent Office 3,726,883
Patented Apr. 10, 1973

3,726,883
2,2-DI- AND 2,2,3-TRI-LOWER ALKYL CHROMAN-AND CHROMEN-OLS AND SALTS, ETHERS AND ESTERS THEREOF
Raj Kumar Razdan, Belmont, Mass., and William Raymond Thompson, Ithaca, N.Y., assignors to Beecham Group Limited, Brentford, England
No Drawing. Continuation-in-part of application Ser. No. 36,466, May 11, 1970, which is a continuation-in-part of application Ser. No. 1,543, Jan. 8, 1970, which is a continuation-in-part of application Ser. No. 866,743, Oct. 15, 1969, which in turn is a continuation-in-part of application Ser. No. 630,808, Apr. 14, 1967, all now abandoned. This application June 9, 1971, Ser. No. 151,578
Int. Cl. C07d 31/28
U.S. Cl. 260—297 B      26 Claims

ABSTRACT OF THE DISCLOSURE

Novel chemical compounds and their salts, ethers and esters are disclosed wherein the compounds have the formulas:

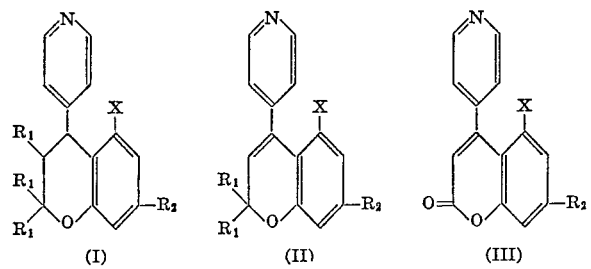

in which $R_1$ is lower alkyl having 1 to 6 carbon atoms,
$R_2$ is alkyl having 1 to 20 carbon atoms or cycloalkyl-lower-alkyl, the cycloalkyl part having 3 to 8 carbon atoms, and
X is OH or a pharmaceutically acceptable salt including an alkali metal salt or alkaline earth metal salt, or an etherified or esterified OH-group, exclusive of amino acid esters.

Compounds I and II possess beneficial pharmacodynamic activity with respect to the cardiovascular and central nervous system, and compounds III are intermediates for use in the preparation of compounds I and II.

CROSS REFERENCE TO RELATED APPLICATIONS

This application is a continuation-in-part of application Ser. No. 36,466 filed May 11, 1970, which is a continuation-in-part of application Ser. No. 1,543, filed Jan. 8, 1970, which in turn is a continuation-in-part of application Ser. No. 866,743 filed Oct. 15, 1969 and which in its turn is a continuation-in-part of application Ser. No. 630,808 filed Apr. 14, 1967, and all now abandoned.

The present invention relates to the new chemical compounds I and II:

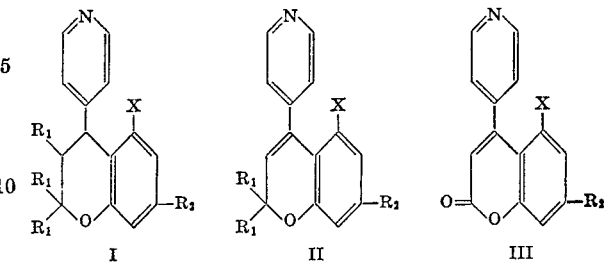

and non-toxic acid addition salts thereof, wherein $R_1$ is lower alkyl having 1 to 6 carbon atoms,
$R_2$ is alkyl having 1 to 20 carbon atoms or cycloalkyl-lower-alkyl, the cycloalkyl part having 3 to 8 carbon atoms, and
X is OH or a pharmaceutically acceptable salt thereof including an alkali metal salt or alkaline earth metal salt, or an etherified or esterified OH-group, exclusive of amino acid esters, which are useful as antidepressants and anti-anxiety agents and which are non-toxic when administered orally or parenterally. Compounds III are valuable coumarin intermediates for I and II.

Extensive work has been carried out in synthesizing pharmacodynamically active chemical compounds to find non-toxic compounds which will produce certain desired results on the cardiovascular and central nervous system without complete success.

It is, therefore, a major object of this invention to provide novel compounds I and II which possess pharmacodynamic activity with respect to hypertension and analgesia, and which are useful as antidepressants and anti-anxiety agents. It is another object to provide compounds of the character described which exhibit low toxicity, and which may be nondependence-providing drugs. A further object resides in solubilized derivatives of the 5-OH group when X=OH and esters and ethers of the 5-OH group which are non-toxic when administered orally or parenterally.

This invention therefore resides in the chemical compounds I and II which are herein designated as 2,2,3-tri-lower-alkyl-7-alkyl- (and 7-cycloalkyl-lower-alkyl-)4-(4-pyridyl)-5-chroman-ols, and 2,2-di-lower-alkyl-7-alkyl-(and 7 - cycloalkyl-lower-alkyl-)4-(4-pyridyl)-2H-chromen-5-ols and their alkali and alkaline earth metal, acid addition and other pharmaceutically acceptable salts, and ether and ester derivatives thereof, excluding amino acid and esters.

Illustrative embodiments of the invention are those of Formulas I and II, respectively:

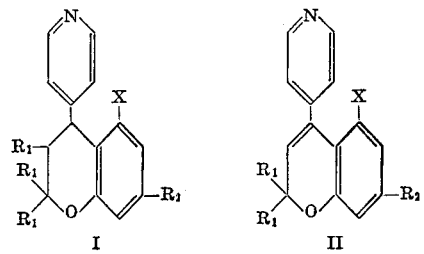

wherein $R_1$, $R_2$ and X have the above stated meanings. Compound II in which $R_1$=methyl, $R_2$=methyloctyl and X=OH or ONa represents a preferred and best mode exemplification of the invention.

The term "lower-alkyl" as used to define $R_1$ means saturated, monovalent aliphatic radicals, including straight and branched-chain radicals of from one to six carbon atoms, as illustrated by methyl, ethyl, propyl, isopropyl, butyl, sec.-butyl, amyl and hexyl. Each $R_1$ is preferably methyl.

The term "alkyl" as used to define $R_2$ means saturated, monovalent aliphatic radicals, including straight and branched-chain radicals of from one to twenty carbon atoms, as illustrated by methyl, ethyl, propyl, n-butyl, n-amyl, n-hexyl, 2-heptyl, n-heptyl, 3-methyl-2-octyl, n-octyl, nonyl, tetradecyl, n-hexadecyl, eicosanyl, and the like, and the term "cycloalkyl" means cyclic, saturated aliphatic radicals of from three to eight carbon atoms, as illustrated by cyclopropyl, cyclobutyl, 2-methylcyclobutyl, cyclohexyl, 4-methylcyclohexyl, cyclooctyl, and the like. Preferably $R_2$ is a methyloctyl group, especially 3-methyl-2-octyl.

X as used herein means preferably OH but includes salts such as —ONa or —OK or other pharmaceutically acceptacle alkali and alkaline earth salts and esters (other than amino acid esters) and ethers.

When X is an ester group, it is an acyloxy radical having from 1 to 20 carbon atoms, preferably an acetoxy, propionoxy, butyroxy, hexanoyloxy, octoyloxy, decanoyloxy or dodecanoyloxy group or an aromatic acyloxy group such as a benzoyloxy or naphthoyloxy group. However X may also be derived from a polybasic acid such as malonic, succinic, glutamic or citric acid. The polybasic acid may also be inorganic in nature such as phosphoric, carbonic or carbamic acid. Polybasic acid derivatives may be formed as mono-chromenol esters with the other basic groups of the acid being in the free acid or salt form or in the form of other esters, particularly lower-alkyl esters thereof. For example X may represent a hemisuccinate, a mono-phosphate ester of the free acid, alkali-metal salt or di- or tri-ester forms, or may be a lower-alkyl carbonate or carbamate ester group.

When X is an ether group this may be a simple alkyl ether, particularly a lower-alkyl ether, so that X may represent a methoxy, ethoxy, propoxy or butyroxy group. However the alkyl group may be substituted by halogen atom(s) or amino group(s) and preferred ethers for present use are the ethers of N,N-di-(lower-alkyl)-2-aminoethanol. Also in the case of tertiary amino groups, the groups attached to the nitrogen atom may be linked to each other or through further hetero atoms to form heterocyclic groups including the nitrogen of the amino group to which they are both attached. When basic groups are present in the ether moiety, these may be in the form of salts of appropriate acids.

It will thus be appreciated that Formulas I and II not only represent the structural configuration of the compounds of the invention as shown, but are also representative of the respective structural entities common to all of the compounds of Formulas I and II whether in the forms illustrated or in the forms of their acid salts or other derivatives. They also include geometric and optical and stereo isomers. It has been found that by virtue of this common structural entity, these compounds and their acid addition salts or other derivatives have pharmacodynamic activity of a type to be more fully described hereinbelow. This pharmacodynamic activity is utilized in useful form for pharmaceutical purposes by employing the compounds themselves or the acid addition salts or other derivatives formed from pharmaceutically-acceptable acids or esters of strong acids, that is, acids or esters whose anions are innocuous to the animal organism in effective doses of the salts so that beneficial properties existing in the common structural entity represented by the free bases are not vitiated by side-effects ascribable to the anions.

In utilizing this pharmacodynamic activity of the salts of the invention, pharmaceutically-acceptable non-toxic salts are used. Although enhanced water-insolubility, increased toxicity, or lack of crystalline character may make some particular salt species less suitable or less desirable for use as such in a given pharmaceutical application, the water-insoluble or more toxic salts can be converted to pharmaceutically-acceptable compounds by techniques well known in the pharmaceutical art.

It will be appreciated from the foregoing that all of the acid addition salts of our new compounds are useful and valuable compounds regardless of considerations of solubility, toxicity, physical form, and the like, and accordingly are within the purview of the instant invention.

The invention further resides in the chemical compounds (III) which are herein designated as 5-X-7-alkyl-(and 7-cycloalkyl-lower-alkyl-)-4-(4-pyridyl) coumarins having the formula:

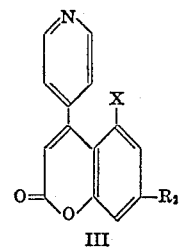

III wherein $R_2$ and X have the meanings given above, and which are useful as intermediates in the preparation of the compounds of Formulas I and II.

Compounds of Formula I (X=OH) may be prepared by reacting a 5-hydroxy-7-alkyl-(and 7-cycloalkyl-lower-alkyl-)4-(4-pyridyl) coumarin, illustrated above by Formula III (X=OH) with a lower alkyl magnesium halide to produce a 2,2,3-tri-lower-alkyl-7-alkyl-(and 7-cycloalkyl-lower-alkyl-)4-(4-pyridyl) 5 - chromanol of Formula I (X=OH). The reaction is carried out in an organic solvent which is inert under the conditions of the reaction. Suitable solvents are diethyl ether, dibutyl ether, tetrahydrofuran, anisole, pyridine, and the like. It is preferred to add a solution of the 5-hydroxy-7-alkyl-(and 7-cycloalkyl-lower-alkyl-)4-(4-pyridyl) coumarin in anisole solution to a solution of the Grignard reagent in anisole. The reaction is carried out at an elevated temperature, preferably at 100° C. for an extended period of time, e.g., at least 24 hours.

Compounds of Formula II (X=OH) may be prepared by reacting a 5-hydroxy-7-alkyl-(and 7-cycloalkyl-lower-alkyl-)4-(4-pyridyl) coumarin, illustrated above by Formula III (X=OH), with a lower alkyl magnesium halide to produce a 2,2-di-lower-alkyl-7-alkyl-(and 7-cycloalkyl-lower-alkyl-)4-(4-pyridyl)-2H-chromen-5-ol of Formula II (X=OH). The reaction is carried out in an organic solvent as described above and in the same manner except that the reaction temperature is maintained at a lower level.

The preparation of the coumarin intermediates of Formula III (X=OH) may be carried out, for example, by reacting methyl-β-oxo-4-pyridine-propionate with a 5-alkyl-(and 5-cycloalkyl-lower-alkyl-)resorcinol to produce a 5-hydroxy-7-alkyl-(and 7-cycloalkyl-lower-alkyl-) 4-(4-pyridyl) coumarin of Formula III (X=OH). The reaction is carried out in a mixture of concentrated sulfuric acid and phosphorus oxychloride, or in the presence of other condensation agents such as aluminum chloride, hydrogen chloride, and polyphosphoric acid, and is illustrated by the equation:

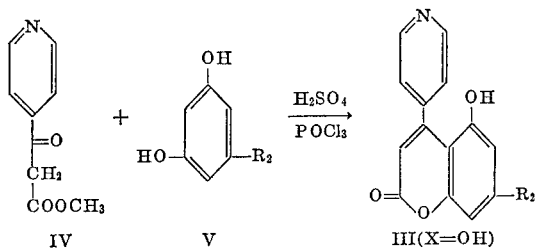

wherein $R_2$ is as defined above.

The resulting 5-hydroxy-7-alkyl-(and 7-cycloalkyl-lower-alkyl)4-(4-pyridyl) coumarins are preferably isolated by the addition of a base to the reaction mixture to convert the salt to the free base.

Instead of methyl-$\beta$-oxo-4-pyridine-propionate, there can be used the corresponding ethyl or other lower alkyl compound of 1 to 6 carbon atoms.

The intermediate methyl-$\beta$-oxo-4-pyridine-propionate of Formula IV is conveniently prepared according to the procedure of Moffat described in J. Med. Chem. 7, 449 (1964), and the intermediate 5-alkyl-(and 5-cycloalkyl-lower-alkyl)resorcinols of Formula V are conveniently prepared according to procedure of Adams, Mackenzi and Loewe described in J. Am. Chem. Soc., 70, 669 (1948).

Thus, compounds in which X is an esterified derivative, i.e., an acyloxy group (exclusive of amino acid esters which form no part of this invention), are prepared by the reaction of the said chromenols, or a reactive derivative thereof such as a metal salt with an esterifying acid or a reactive derivative thereof such as an acid halide or anhydride. The acid may be mono- or poly-basic and organic or inorganic. Examples include acetic acid, succinic acid, phosphoric acid, carbonic acid and carbamic acid.

Compounds in which X is an etherified derivative of the hydroxyl group, including simple ethers broadly, are prepared by the reaction of reactive derivatives of the etherifying group with a compound in which X is OH or a reactive derivative thereof such as a metal salt. Thus, for example, an alkyl halide may be reacted with a compound in which X is ONa to produce an alkyl ether.

The basic groups such as amino groups may be in the form of salts with acids.

The derivatives of the hydroxyl group may be chonsen to modify the physical or chemical properties of the compound. Thus, for example, while many compounds in which X is OH are found to be sparingly soluble in aqueous media or virtually insoluble, a compound of the formula:

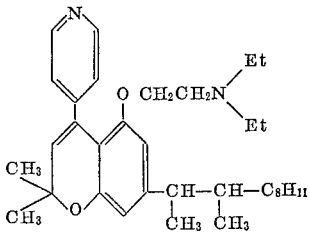

was found to be freely soluble in dilute hydrochloric acid and the hydrochloric acid salt was soluble in water.

The derivatives are selected or chosen to have acceptable pharmaceutical properties, especially low toxicity.

Preparation of the derivatives of the OH group is conveniently performed using the chroman or chromen derivatives of Formulas I and II but in some cases the OH derivative may be formed at an earlier stage in the preparation, for example, using the coumarin of Formula III. Clearly the nature of the derivative will determine whether it will survive the later stages of the preparation. Thus, for example, etherified derivatives will often be stable while esterified derivatives may be hydrolyzed back to the OH group.

In the preparation of some derivatives modified procedure may be found preferable. For example, in the preparation of phosphate derivatives of compounds in which X is OH, a reaction scheme as outlined below may be employed:

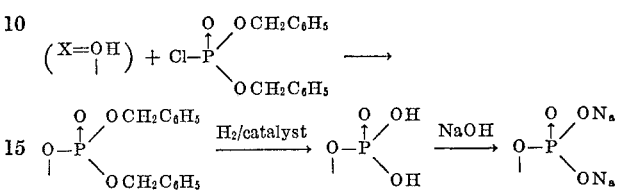

The compounds of Formulas I and II have been shown to possess central nervous system activity as evidenced by gross overt changes induced by parenteral and oral administration in mice and rats in standard tests involving observations of psychomotor activity, reactivity to stimuli, and ability to perform normal, non-conditioned motor tasks. The compounds also show activity in a number of conditioned behavioral tests in monkeys. This activity indicates their usefulness as psychotropic agents. In addition, certain of the compounds produce depressor response in cat blood pressure studies.

The compounds can be prepared for use by dissolving under sterile conditions a salt form of the compounds in water (or an equivalent amount of a non-toxic acid if the compounds of Formulas I and II are used), or in a physiologically compatible aqueous medium such as saline, and stored in ampoules for intramuscular injection. Alternatively, they can be incorporated in unit dosage form as tablets or capsules for oral administration either alone or in combination with suitable adjuvants or excipients such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared.

The molecular structures of the compounds of our invention were assigned on the basis of a study of their infrared, ultraviolet and NMR spectra, of mass spectrometry and their transformation products; and they were confirmed by the correspondence of calculated and found values for the elementary analyses for representative examples.

The invention is illustrated by the following representative examples.

EXAMPLE 1

5-hydroxy-7-(3-methyl-2-octyl)-4-(4-pyridyl) coumarin

To a mixture of 2.1 g. (0.0117 mole) of methyl-$\beta$-oxo-4-pyridine-propionate and 2.8 g. (0.0118 mole) of 5-(3-methyl-2-octyl) resorcinol was added dropwise with cooling 5 ml. of concentrated sulfuric acid. The mixture was then treated all at once with 3 ml. of phosphorus oxychloride and the viscous solution was stirred at room temperature for 48 hours. It was then poured into cold potassium bicarbonate solution and extracted with ether several times. The combined ether extract was washed, dried and evaporated to leave a yellow solid which was recrystallized from dilute ethanol to give 3.4 g. of 5-hydroxy-7-(3-methyl-2-octyl)-4-(4-pyridyl) coumarin. The compound had a melting point of 191–194° C. and showed an ultraviolet absorption at 315 m$\mu$.

$$\lambda_{max.}^{EtOH}\ 11{,}700$$

*Analyis.*—Calculated for $C_{23}H_{27}O_3N$ (percent): C, 75.59; H, 7.45; N, 3.83. Found (percent): C, 75.42; H, 7.43; N, 3.76.

EXAMPLE 2

2,2,3-trimethyl-7-(3-methyl-2-octyl)-4-(4-pyridyl)-5-chromanol

Methyl bromide was bubbled into a stirred mixture of 18.0 g. (0.75 mole) of magnesium and dry ether under nitrogen until all the magnesium had dissolved. The ether was then distilled and simultaneously replaced with dry anisole maintaining constant volume. After all the ether had been removed, 27.6 g. (0.075 mole) of the 5-hydroxy-7-(3-methyl-2-octyl)-4-(4-pyridyl) coumarin of Example 1 in anisole solution was added dropwise. When addition was complete the mixture was stirred and heated at 100° C. for 2 days. The mixture was poured into a large excess of 4 N sulfuric acid and steam-distilled to remove anisole. The residue was extracted with ether, washed, dried and evaporated to leave a reddish oil. This was dissolved in 250 ml. of heptane, 5 ml. of 48% hydrobromic acid was added, and the mixture was then refluxed for 6 hours. After cooling the heptane was removed on a rotary evaporator and the residue was extracted with ether. The ethereal extract was washed with sodium bicarbonate solution, then with water and dried over sodium sulfate. On evaporation of the ether, a gummy residue was obtained which crystallized on trituration wtih acetonitrile to give 6.0 g. of 2,2,3-trimethyl-7-(3-methyl-2-octyl)-4-(4-pyridyl)-5-chromanol of M.P. 192–195° C.

*Analysis.*—Calculated for $C_{26}H_{37}O_2N$ (percent): C, 78.94; H, 9.43; N, 3.54. Found (percent): C, 78.80; H, 9.38; N, 3.47.

EXAMPLE 3

2,2-dimethyl-7-(3-methyl-2-octyl)-4-(4-pyridyl)-2H-chromen-5-ol

A solution of 5.0 g. (0.0137 mole) of the 5-hydroxy-7-(3-methyl-2-octyl)-4-(4-pyridyl) coumarin of Example 1 in anisole was added dropwise to a solution of methyl magnesium bromide (prepared from 3.3 g. (0.138 mole) of magnesium as described in the previous example) in anisole. When the addition was complete the mixture was stirred and heated at 50° C. for 16 hours. After working up in a similar manner as described in Example 2, a solid was obtained which was recrystallized from acetonitrile to give 2.9 g. of 2,2-dimethyl-7-(3-methyl-2-octyl)-4-(4-pyridyl)-2H-chromen-5-ol of M.P. 85–90° C. It showed ultraviolet absorption at 263 mμ

$$\lambda_{max.}^{EtOH}\ 10{,}000$$

*Analysis.*—Calculated for $C_{26}H_{37}O_2N$ (percent): C, 78.94; H, 9.43; N, 3.54. Found (percent): C, 78.80; H, 9.38; N, 3.47.

EXAMPLE 4

5-hydroxy-7-methyl-4-(4-pyridyl) coumarin

To a mixture of 5.4 g. of methyl-β-oxo-4-pyridinepropionate and 3.75 g. of resorcinol was added dropwise with cooling, 15 ml. of concentrated sulfuric acid. The mixture was then treated all at once with 6 ml. of phosphorus oxychloride and the viscous solution was stirred at room temperature for 16 hrs. and then poured into ammonium hydroxide solution containing ice and the pH adjusted to neutral with potassium bicarbonate solution. A fine precipitate was obtained which was filtered, and recrystallized from boiling ethanol to give 6.5 g. of 5-hydroxy-7-methyl-4-(4-pyridyl) coumarin of M.P. 304–306° C.

*Analysis.*—Calculated for $C_{15}H_{11}NO_3 \cdot \frac{1}{2}H_2O$ (percent): C, 68.7; H, 4.58; N, 5.35. Found (percent): C, 68.82; H, 4.63; N, 5.42. It showed ultraviolet absorption at 314 mμ

$$\lambda_{max.}^{EtOH}\ 10{,}280$$

The structure was confirmed by NMR analysis to be:

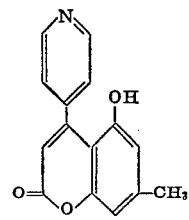

EXAMPLE 5

2,2,7-trimethyl-4-(4-pyridyl)-2H-chromen-5-ol

A suspension of 2 g. of 5-hydroxy-7-methyl-4-(4-pyridyl) coumarin in anisole was added in small portions to a solution of methyl mangesium bromide (prepared from 1.9 g. of magnesium as described in Example 2) in anisole. When the addition was complete, the mixture was stirred and heated at 50° C. for 16 hrs. After workup in a similar manner as described in Example 2, a solid was obtained which was recrystallized from methanol/acetonitrile mixture to give 0.7 g. of 2,2,7-trimethyl-4-(4-pyridyl)-2H-chromen-5-ol of M.P. 240–245° C.

*Analysis.*—Calculated for $C_{17}H_{17}O_2N$ (percent): C, 76.38; H, 6.41; N, 5.24. Found (percent): C, 76.20; H, 6.31; N, 5.42.

The structure was confirmed by NMR analysis to be:

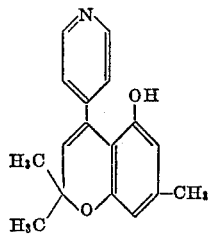

EXAMPLE 6

7-n-heptyl-5-hydroxy-4-(4-pyridyl) coumarin

To a mixture of ethyl isonicotinoylacetate (21.1 g., 0.11 mole) and 5-n-heptylresorcinol (22.76 g., 0.11 mole) was added concentrated sulfuric acid (46 ml.) followed by phosphorus oxychloride (28 ml.), the mixture being cooled during the addition. After stirring for 24 hours, the brown oil was poured into a stirred solution of sodium bicarbonate and the resulting yellow gum was extracted into chloroform. After drying, removal of the solvent gave a yellow solid which crystallized from aqueous ethanol to give 7-n-heptyl-5-hydroxy-4-(4-pyridyl) coumarin (23.45 g., 68%) M.P. 164–166° C., $$\lambda_{max.}^{EtOH}\ 317\ m\mu$$

ε=11,170.

*Analysis.*—Calculated for $C_{21}H_{23}NO_3$ (percent): C, 74.75; H, 6.9; N, 4.15. Found (percent): C, 75.0; H, 7.1; N, 4.3.

EXAMPLE 7

2,2-dimethyl-7-n-heptyl-4-(4-pyridyl)-2H-chromen-5-ol

A solution of 7-n-heptyl-5-hydroxy-4-(4-pyridyl) coumarin (20.22 g., 0.06 mole) in dry benzene (400 ml.) was added dropwise to a solution of methyl magnesium bromide (prepared from magnesium (14.58 g., 0.6 g. atom) and methyl bromide in ether (400 ml.)). When addition was complete, the mixture was refluxed for 2 hours, cooled, and poured into saturated ammonium chloride solution (2 l.) with stirring. The organic layer was separated, washed, dried and evaporated to give a brown oil which solidified (18.1 g., M.P.~60° C.). This material was refluxed in glacial acetic acid for 2 hours, and then the solution was poured into water (1 l.) with stirring. The solid which separated was extracted into ether and the extract washed with sodium bicarbonate solution and water. After drying, removal of the solvent gave a brown gum which, on crystallization from aqueous acetonitrile (charcoal) gave 2,2-dimethyl-7-n-heptyl-4-(4-pyridyl)-2H-chromen-5-ol (6.76 g., 32%), M.P. 154–155° C., $$\lambda_{max.}^{EtOH}\ 264\ m\mu$$

$\epsilon=9280$.

*Analysis.*—Calculated for $C_{23}H_{29}NO_2 \cdot \frac{1}{2}H_2O$ (percent): C, 76.7; H, 8.3; N, 3.9. Found (percent): C, 76.6; H, 8.35; N, 3.9%.

EXAMPLE 8

5-hydroxy-7-n-pentyl-4-(4-pyridyl) coumarin

To a mixture of ethyl isonicotinoylacetate (26.8 g., 0.139 mole) and 5-n-pentylresorcinol (25 g., 0.139 mole) was added concentrated sulfuric acid (60 ml.) and phosphorus oxychloride (36 ml.) at 0–5° C. After stirring for 20 hours at room temperature, working up as in Example 4 gave 5-hydroxy-7-n-pentyl-4-(4-pyridyl) coumarin (32.0 g., 72%), M.P. 182–184° C. as yellow crystals ex aqueous ethanol.

$$\lambda_{max.}^{EtOH}\ 317\ m\mu$$

*Analysis.*—Calculated for $C_{19}H_{19}NO_3$ (percent): C, 73.8; H, 6.15; N, 4.5. Found (percent): C, 73.6; H, 6.3; N, 4.4.

EXAMPLE 9

2,2-dimethyl-7-n-pentyl-4-(4-pyridyl)-2H-chromen-5-ol

A solution of 5-hydroxy-7-n-pentyl-4-(4-pyridyl) coumarin (5.0 g., 0.016 mole) in dry benzene (100 ml.) was added dropwise to a solution of methyl magnesium bromide [from magnesium (3.84 g., 0.16 g. atom) and methyl bromide in ether (100 ml.)]. Following the procedure outlined in Example 7, there was obtained 2,2-dimethyl-7-n-pentyl-4-(4-pyridyl)-2H-chromen-5-ol (2.01 g., 39%), M.P. 173–174° C. ex acetonitrile-methanol charcoal).

$$\lambda_{max.}^{EtOH}\ 264\ m\mu$$

*Analysis.*—Calculated for $C_{21}H_{25}NO_2$ (percent): C, 78.0; H, 7.7; N, 4.3. Found (percent): C, 78.0; H, 8.0; N, 4.3.

EXAMPLE 10

2,2,3-trimethyl-7-n-pentyl-4-(4-pyridyl)-chroman-5-ol 5-hydroxy-7-n-pentyl-4-(4-pyridyl) coumarin (21.7 g. 0.07 mole) in dry anisole (100 ml.) was added dropwise over 30 minutes to methyl magnesium bromide in anisole (150 ml.) prepared as described in Example 2 from magnesium (16.8 g., 0.7 g. atom) and methyl bromide in ether (300 ml.), followed by displacement of ether. After heating at 100° C. for 48 hours, the mixture was poured into excess 4 N sulfuric acid and steam distilled to remove the anisole. The residue was extracted into ether, washed, dried and evaporated to give an oil which was then refluxed in glacial acetic acid for 3 hours. After pouring into water, extraction with ether, and washing with sodium bicarbonate solution, an oil (11.8 g.) was obtained from which a solid (4.3 g.) M.P. 202–204° C. was obtained by sublimation at 200° C./0.2 mm. Two crystallizations from acetonitrile afforded 2,2,3-trimethyl-7-n-pentyl-4-(4-pyridyl)-chroman-5-ol (2.8 g., 11.5%), M.P. 210–211° C.

*Analysis.*—Calculated for $C_{22}H_{29}NO_2$ (percent): C, 77.8; H, 8.6; N, 4.1. Found (percent): C, 78.05; H, 8.9; N, 3.9.

EXAMPLE 11

5-hydroxy-7-n-nonyl-4-(4-pyridyl) coumarin

To a mixture of ethyl isonicotinoylacetate (9.6 g., 0.05 mole) and 5-n-nonylresorcinol (11.8 g., 0.05 mole) was added concentrated sulfuric acid (30 ml.) and phosphoryl chloride (20 ml.) at 0–5° C. The mixture was stirred for 17 hours at room temperature and worked up as in Example 4 to give 5-hydroxy-7-n-nonyl-4-(4-pyridyl) coumarin (9.2 g., 51%), M.P. 154–155° C. ex aqueous ethanol.

*Analysis.*—Calculated for $C_{23}H_{27}NO_3$ (percent): C, 75.6; H, 7.45; N, 3.8. Found (percent): C, 75.7; H, 7.7; N, 3.8.

EXAMPLE 12

2,2-dimethyl-7-n-nonyl-4-(4-pyridyl)-2H-chromen-5-ol

A solution of 5 - hydroxy - 7-n-nonyl-4-(4-pyridyl) coumarin (18.25 g., 0.05 mole) in dry benzene (300 ml.) was added dropwise to a stirred solution of methyl magnesium bromide (0.5 mole) in dry ether (100 ml.). Following the procedure outlined in Example 7 there was obtained 2,2-dimethyl-7-n-nonyl-4-(4-pyridyl)-2H-chromen-5-ol (8.32 g., 44%), M.P. 148–149° C. (acetonitrile).

*Analysis.*—Calculated for $C_{25}H_{33}NO_2$ (percent) C, 79.1; H, 8.8; N, 3.7. Found (percent): C, 79.0; H, 8.7; N, 3.5.

EXAMPLE 13

5-hydroxy-7-(2-octyl)-4-(4-pyridyl) coumarin

To a mixture of ethyl isonicotinoylacetate (25.1 g., 0.13 mole) and 5-(2-octyl)resorcinol (29.0 g., 0.13 mole) was added concentrated sulfuric acid (60 ml.) and phosphoryl chloride (36 ml.) at 0–5° C. The mixture was stirred for 17 hours at room temperature and worked up as in Example 4 to give 5-hydroxy-7-(2-octyl)-4-(4-pyridyl) coumarin (37.92 g., 82%) M.P. 203–205° C. ex aqueous ethanol.

*Analysis.*—Calculated for $C_{22}H_{25}NO_3$ (percent): C, 75.2; H, 7.2; N, 3.9. Found (percent): C, 75.1; H, 7.3; N, 3.9.

EXAMPLE 14

2,2-dimethyl-7-(2-octyl)-4-(4-pyridyl)-2H-chromen-5-ol

A solution of 5-hydroxy-7-(2-octyl)-4-(4-pyridyl) coumarin (10.1 g., 0.03 mole) in dry benzene (100 ml.) was added dropwise to a stirred solution of methyl magnesium bromide (0.3 mole) in dry ether (150 ml.). Following the procedure outlined in Example 7 there was obtained 2,2 - dimethyl - 7-(2-octyl)-4-(4-pyridyl)-2H-chromen-5-ol (3.8 g., 36%), M.P. 152–154° C. ex acetonitrile.

*Analysis.*—Calculated for $C_{24}H_{31}NO_2$ (percent): C, 78.9; H, 8.55; N, 3.8. Found (percent): C, 78.5; H, 8.6; N, 3.7.

EXAMPLE 15

5-hydroxy-7-(3-nonyl)-4-(4-pyridyl) coumarin

To a mixture of ethyl isonicotinoylacetate (24.7 g., 0.127 mole) and 5-(3-nonyl)-resorcinol (30.0 g., 0.127 mole) was added concentrated sulfuric acid (60 ml.) and phosphoryl chloride (36 ml.) at 0–5° C. The mixture was stirred for 18 hours at room temperature and worked up as in Example 4 to give 5-hydroxy-7-(3-nonyl)-4-(4-pyridyl) coumarin (31.0 g., 67%), M.P. 219–221° C. ex aqueous ethanol.

*Analysis.*—Calculated for $C_{23}H_{27}NO_3$ (percent): C, 75.6; H, 7.4; N, 3.8. Found (percent): C, 75.5; H, 7.6; N, 3.8.

EXAMPLE 16

2,2-dimethyl-7-(3-nonyl)-4-(4-pyridyl)-2H-chromen-5-ol

A solution of 5-hydroxy-7-(3-nonyl)-4-(4-pyridyl) coumarin (18.35 g., 0.05 mole) in dry benzene (150 ml.) was added dropwise to a stirred solution of methyl magnesium bromide (0.5 mole) in dry ether (200 ml.). Following the procedure outlined in Example 7 there was obtained 2,2 - dimethyl - 7-(3-nonyl)-4-(4-pyridyl)-2H-chromen-5-ol (8.25 g., 33.5%) isolated as the hemihydrate, M.P. 141–142° C. ex acetonitrile.

*Analysis.*—Calculated for $C_{25}H_{33}NO_2\cdot\frac{1}{2}H_2O$ (percent): C, 77.3; H, 8.8; N, 3.6. Found (percent): C, 77.5; H, 8.8; N, 3.5.

EXAMPLE 17

2,2-diethyl-7-n-heptyl-4-(4-pyridyl)-2H-chromen-5-ol

7 - n-heptyl-5-hydroxy-4-(4-pyridyl) coumarin (described in Example 6) (6.75 g., 0.02 mole) was added portionwise to a stirred solution of ethyl magnesium bromile (0.06 mole) in dry ether (120 ml.). The mixture was stirred at room temperature for 1 hour and then decomposed by pouring into a solution of ammonium chloride. The organic layer was separated, dried ($MgSO_4$) and evaporated to give a yellow solid which on crystallization from carbon tetrachloride gave the intermediate triol (1.75 g.) M.P. 161–162° C. This intermediate was heated under reflux in glacial acetic acid for 1 hour, cooled and poured into water to give 2,2-diethyl-7-n-heptyl-4-(4-pyridyl)-2H-chromen-5-ol (0.9 g., 12%) isolated as the hemihydrate, M.P. 121–122° C. (acetonitrile).

*Analysis.*—Calculated for $C_{25}H_{33}NO_2\cdot\frac{1}{2}H_2O$ (percent): C, 77.3; H, 8.8; N, 3.6. Found (percent): C, 76.9; H, 8.6; N, 3.6.

EXAMPLE 18

2,2-dimethyl-7-n-heptadecyl-4-(4-pyridyl)-2H-chromen-5-ol

Methyl iodide (28.4 g., 0.2 mole) in dry ether (15 ml.) was added dropwise to a stirred suspension of magnesium turnings (4.6 g., 0.2 mole) in dry ether (125 ml.) under a stream of nitrogen. When all the magnesium had reacted the 7 - n-heptadecyl - 5 - hydroxy-4-(4-pyridyl) coumarin (9.54 g., 0.02 mole) was added without solvent over ½ hour. When the addition was complete the mixture was stirred at room temperature for 1 hr.

The mixture was poured into a saturated solution of ammonium chloride and extracted with ether. The extract was washed with water, dried ($MgSO_4$) and evaporated. The residue (8.45 g.) was dissolved in glacial acetic acid (50 ml.) and heated under reflux for 1 hr. After cooling, the dark liquid was poured with stirring into sodium carbonate solution and the precipitate collected and crystallized from methanol to give 2,2-dimethyl-7-n-heptadecyl-4-(4-pyridyl)-2H-chromen-5 - ol (4.88 g., 50%), M.P. 120–121° C.

*Analysis.*—Calculated for $C_{33}H_{49}NO_2$ (percent): C, 80.65; H, 10.0; N, 2.85. Found (percent): C, 80.5; H, 10.0; N, 2.7.

The intermediate 7-n-heptadecyl-5-hydroxy-4-(4 - pyridyl) coumarin was prepared by adding concentrated sulphuric acid (30 ml.) and phosphoryl chloride (18 ml.) at 0–5° C. to a mixture of ethyl isonicotinoylacetate (9.7 g., 0.05 mole) and 5-n-heptadecyl-resorcinol (17.4 g., 0.05 mole) and stirring the mixture for 17 hours at room temperature and then working it up as in Example 4 to obtain the 7-n-heptadecyl-5-hydroxy-4-(4-pyridyl) coumarin (11.9 g., 50% yield) of M.P. 117–118° C. (ethanol).

*Analysis.*—Calculated for $C_{31}H_{43}NO_3$ (percent): C, 78.0; H, 9.0; N, 2.9. Found (percent): C, 77.7; H, 9.1; N, 3.0.

EXAMPLE 19

5-acetoxy-2,2-dimethyl-7-(2-octyl)-4-(4-pyridyl)-2H-chromen 2,2-dimethyl-7-(2-octyl)-4-(4 - pyridyl)-2H-chromen-5-ol (10.95 g., 0.03 mole), anhydrous sodium acetate (3.0 g.) and acetic anhydride (60 ml.) were heated together under reflux for 2 hours. After cooling, the mixture was stirred with water (200 ml.) and extracted with ether. The ethereal extract was washed with sodium carbonate solution, washed with water, dried and evaporated to yield a pale brown oil. Distillation of this material gave the acetate (10.0 g., 82%) M.P. 206–208°/0.8 mm.

*Analysis.*—Calculated for $C_{26}H_{33}NO_3$ (percent): C, 76.7; H, 8.1; N, 3.4. Found (percent): C, 76.8; H, 8.3; N, 3.4.

EXAMPLE 20

The hemisuccinate of 2,2-dimethyl-7-n-pentyl-4-(4-pyridyl)-2H-chromen-5-ol 2,2-dimethyl-7-n-pentyl-4-(4 - pyridyl)-2H-chromen-5-ol (0.323 g., 0.001 mole) and succinic anhydride (0.1 g., .001 mole) were treated together in a sealed tube at 150–170° C. for 8 hours. After cooling, the glassy product was triturated with ether and the insoluble material collected by filtration. Crystallization from ethanol gave the hemisuccinate (0.11 g., 26%) M.P. 161–162° C.

*Analysis.*—Calculated for $C_{25}H_{29}NO_5$ (percent): C, 70.9; H, 6.9; N, 3.3. Found (percent): C, 71.0; H, 6.9; N, 3.3.

EXAMPLE 21

Diethylaminoethyl ether of 2,2-dimethyl-7-n-pentyl-4-(4-pyridyl)-2H-chromen-5-ol 2,2-dimethyl-7-n-pentyl-4-(4 - pyridyl)-2H-chromen-5-ol (3.23 g., 0.01 mole) in absolute ethanol (5 ml.) was treated with a solution of sodium (0.23 g., 0.01 g. atom) in absolute ethanol (5 ml.). The ethanol was removed in vacuo to yield the sodium salt of the chromen-5-ol. The salt was suspended on dry benzene (10 ml.) and stirred during the dropwise addition of diethylaminoethyl chloride (2.71 g., 0.02 mole). When the addition was complete the mixture was refluxed for 2 hrs., cooled and extracted with water to remove sodium chloride. After drying ($MgSO_4$) the benzene was removed in vacuo to yield the crude basic ether as a viscous oil.

Treatment of a solution of the crude material in dry ether with ethereal hydrogen chloride gave the diethyl aminoethyl ether as the dihydrochloride (2.85 g., 58%) which crystallized from acetone-ethanol mixture as the monohydrate of M.P. 182–183° C.

*Analysis.*—Calculated for $C_{27}H_{42}Cl_2N_2O_3$ (percent): C, 63.2; H, 8.2; Cl, 13.85; N, 5.5. Found (percent): C, 63.4; H, 8.1; Cl, 13.5; N, 5.2.

EXAMPLE 22

Diethylaminoethyl ether of 2,2-dimethyl-7-(3-methyl-2-octyl)-4-(4-pyridyl)-2H-chromen-5-ol Using the method described under Example 21 there was prepared the diethylaminoethyl ether dihydrochloride (35%) which crystallized from acetone-ethanol mixture as the monohydrate of M.P. 182–184° C.

*Analysis.*—Calculated for $C_{31}H_{50}Cl_2N_2O_3$ (percent): C, 65.4; H, 8.8; Cl, 12.5; N, 4.8. Found (percent): C, 65.8; H, 8.6; Cl, 12.2; N, 4.9.

EXAMPLE 23

Diethylaminoethyl ether of 2,2-dimethyl-7-(2-octyl)-4-(4-pyridyl)-2H-chromen-5-ol Using the method described under Example 21 there was prepared the diethylaminoethyl ether dihydrochloride (65%) which crystallized from acetone-ethanol mixture as the monohydrate of M.P. 186–187° C.

*Analysis.*—Calculated for $C_{30}H_{48}Cl_2N_2O_3$ (percent): C, 64.9; H, 8.6; Cl, 12.8; N, 5.0. Found (percent): C, 64.4; H, 8.8; Cl, 13.0; N, 5.3.

The compounds of Examples 21, 22 and 23 were all highly soluble in water.

EXAMPLE 24

Methyl ether of 2,2-dimethyl-7-(3-methyl-2-octyl)-4-(4-pyridyl)-2H-chromen-5-ol

Using the method described under Example 21 and starting from 2,2-dimethyl-7-(3-methyl-2-octyl)-4-(4-pyridyl)-2H-chromen-5-ol and methyl iodide, this methyl ether was prepared and its structure verified by N.M.R. spectroscopy.

EXAMPLE 25

Carbamate ester of 2,2-dimethyl-7-(3-methyl-2-octyl)-4-(4-pyridyl)-2H-chromen-5-ol Trifluoroacetic acid (1.71 g., 0.015 mole) was added dropwise to a stirred mixture of 2,2-dimethyl-7-(3-methyl-2-octyl)-4-(4-pyridyl)-2H-chromen-5-ol (1.90 g., 0.005 mole) and sodium cyanate (0.65 g., 0.01 mole) in benzene (15 ml.). After 24 hours, additional sodium cyanate (0.65 g., 0.01 mole) and trifluoroacetic acid (1.14 g., 0.01 mole) were added. After a further three days, water was added and the organic layer separated, washed with sodium carbonate solution and dried over magnesium sulphate. Removal of solvent under reduced pressure gave an oil which crystallized on trituration with ether. Recrystallization from ethyl acetate-light petroleum afforded the carbamate (300 mg., 14%), M.P. 170–173° C.

*Analysis.*—Calculated for $C_{26}H_{34}N_2O_3$ (percent): C, 73.9; H, 8.1; N, 6.6. Found (percent): C, 73.6; H, 8.1; N, 6.4.

EXAMPLE 26

Ethyl carbonate ester of 2,2-dimethyl-7-(3-methyl-2-octyl)-4-(4-pyridyl)-2H-chromen-5-ol A mixture of 2,2-dimethyl-7-(3-methyl-2-octyl)-4-(4-pyridyl)-2H-chromen-5-ol (3.79 g., 0.01 mole), ethyl chloroformate (2.17 g., 0.02 mole) and diethylaniline (2.98 g., 0.02 mole) in dry benzene (60 ml.) was heated under reflux with stirring for 4 hours. The solution was cooled, washed successively with hydrochloric acid (5 N), saturated sodium hydrogen carbonate solution and water and dried over magnesium sulphate. Evaporation of solvent under reduced pressure gave the ethyl carbonate (3.40 g., 71%), as a pale yellow gum, the structure of which was verified by N.M.R. spectroscopy.

In analogous manner, compounds can be made in which the 7-cycloalkyl part of 7-cycloalkyl-lower-alkyl is cyclopropyl, cyclobutyl, cyclohexyl and cyclooctyl by substituting the appropriate chromenols for those set forth above. In this way, from such coumarins there are obtained compounds such as 2,2-dimethyl-7-methyl- or -ethyl-cyclohexyl-4-(4-pyridyl)-2H-chromen-5-ol and the 7-methyl-cyclopropyl, -methyl-cyclobutyl, -methyl- or -ethyl-cycloheptyl and -methyl-cyclooctyl analogs thereof as well as other alkylcycloalkyl or cycloalkylalkyl derivatives.

Compounds of the invention wherein, for example, X is —ONa or —OK instead of —OH are prepared in essentially the same manner as compounds (I) and (II) above but by converting the —OH group to alkali metal salt form with a solution of NaOH or KOH, respectively. This is preferably and most simply carried out on a compound (II). For example, compound (II), wherein the substituents $R_1$ are both methyl and the substituent $R_2$ is methyloctyl, has been converted into the sodium salt in which X is ONa. The 2,2-dimethyl-5-hydroxy-7-methyl-octyl compound is reacted with sodium methoxide, refluxed for 1 hour and then evaporated to dryness, the product being a yellowish powder having a melting point of 171 to 176° C. and being non-crystalline. The sodium salt is soluble in ether, but is only extremely slightly soluble in water and for all practical purposes is water insoluble. The sodium salt can be made also by using sodium hydride or sodium hydroxide in place of sodium methoxide. The thus produced sodium salt has the formula:

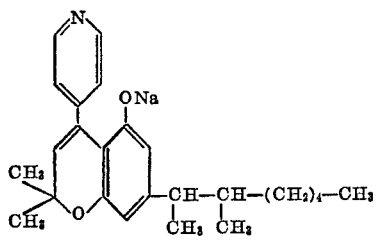

Due to the ionic nature of the nitrogen in the pyridine ring of Formulas I and II, it is possible to form acid addition salts such as those of HCl, BHr, HI and picric acid [$(NO_2)_3C_6H_2OH$]. The compounds of Formulas I and II may be converted to the acid addition salt form by dissolving the compound in an aqueous solution containing the appropriate acid and isolating the salt by evaporating the solution.

What is claimed is:

1. A member of the group consisting of a compound having the formula:

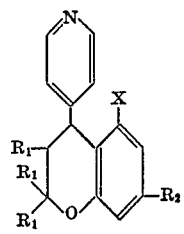

and a compound having the formula:

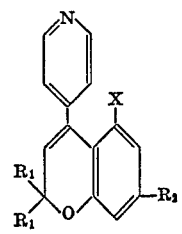

and a non-toxic acid addition salt thereof, wherein $R_1$ is lower alkyl having 1 to 6 carbon atoms, $R_2$ is alkyl having 1 to 20 carbon atoms or cycloalkyl-lower-alkyl, the cycloalkyl part having 3 to 8 carbon atoms, and X is an alkali or alkaline earth metal salt of the OH-group.

2. A compound of claim 1 having the formula:

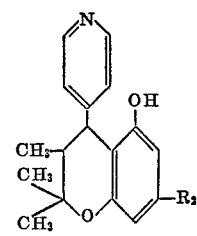

wherein $R_2$ is alkyl of 1 to 20 carbon atoms or cycloalkyl-lower-alkyl, the cycloalkyl part having 3 to 8 carbon atoms.

3. A compound of claim 1 having the formula:

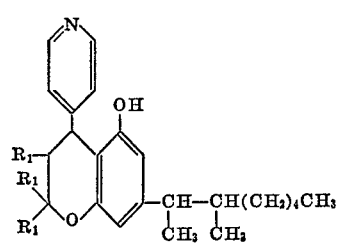

wherein $R_1$ is lower alkyl having 1 to 6 carbon atoms.

4. A compound of claim 1 having the formula:

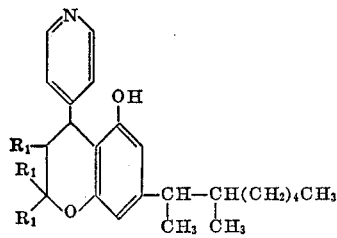

wherein R₁ is methyl.

5. A compound of claim 1 having the formula:

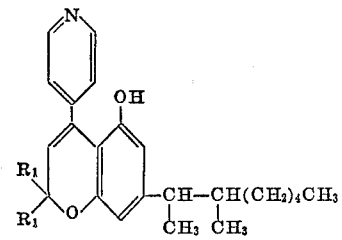

wherein R₁ is lower alkyl having 1 to 6 carbon atoms.

6. A compound of claim 1 having the formula:

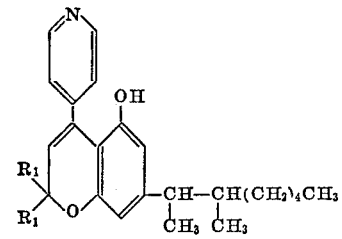

wherein R₁ is methyl.

7. A compound of claim 1 having the formula:

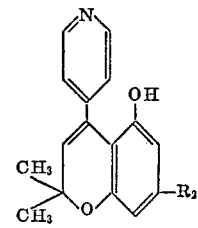

wherein R₂ is alkyl of 1 to 20 carbon atoms or cycloalkyl-lower-alkyl, the cycloalkyl part having 3 to 8 carbon atoms, or a pharmaceutically acceptable acid addition salt.

8. The compound of claim 1 which is 7-(3-methyl-2-octyl)-4-(4-pyridyl)-2,2,3-trimethyl-5-chromanol.

9. The compound of claim 1 which is 2,2-dimethyl-7-(3-methyl-2-octyl)-4-(4-pyridyl)-2H-chromen-5-ol.

10. The compound of claim 1 which is 2,2,7-trimethyl-4-(4-pyridyl)-2H-chromen-5-ol.

11. The compound of claim 1 which is 2,2-dimethyl-7-n-heptyl-4-(4-pyridyl)-2H-chromen-5-ol.

12. The compound of claim 1 which is 2,2-dimethyl-7-n-pentyl-4-(4-pyridyl)-2H-chromen-5-ol.

13. The compound of claim 1 which is 2,2,3-trimethyl-7-n-pentyl-4-(4-pyridyl)-chroman-5-ol.

14. The compound of claim 1 which is 2,2-dimethyl-7-n-nonyl-4-(4-pyridyl)-2H-chromen-5-ol.

15. The compound of claim 1 which is 2,2-dimethyl-7-(2-octyl)-4-(4-pyridyl)-2H-chromen-5-ol.

16. The compound of claim 1 which is 2,2-dimethyl-7-(3-nonyl)-4-(4-pyridyl)-2H-chromen-5-ol.

17. The compound of claim 1 which is 2,2-diethyl-7-n-heptyl-4-(4-pyridyl)-2H-chromen-5-ol.

18. The compound of claim 1 which is 2,2-dimethyl-7-n-heptadecyl-4-(4-pyridyl)-2H-chromen-5-ol.

19. The compound of claim 1 which is 2,2-dimethyl-7-cyclohexyl-4-(4-pyridyl)-2H-chromen-5-ol.

20. The compound of claim 1 which is 2,2-dimethyl-7-cyclopropyl-4-(4-pyridyl)-2H-chromen-5-ol.

21. The compound of claim 1 which is 2,2-dimethyl-7-cyclobutyl-4-(4-pyridyl)-2H-chromen-5-ol.

22. The compound of claim 1 which is 2,2-dimethyl-7-cycloheptyl-4-(4-pyridyl)-2H-chromen-5-ol.

23. The compound of claim 1 which is 2,2-dimethyl-7-cyclooctyl-4-(4-pyridyl)-2H-chromen-5-ol.

24. An alkali metal or alkaline earth metal salt of the compound of claim 1 which is:

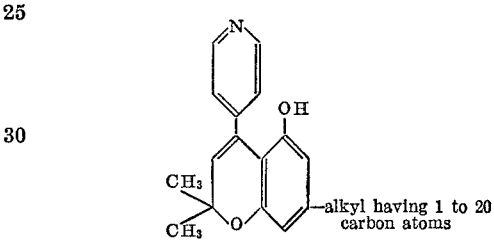

25. The compound of claim 1 which is:

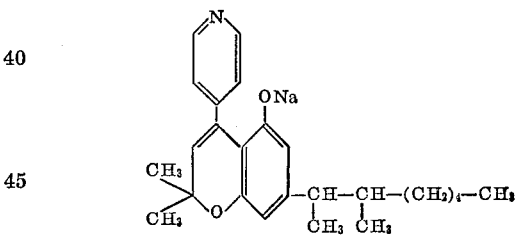

26. The compound of claim 1 which is the hemisuccinate of 2,2 - dimethyl - 7 - n-pentyl-4-(4-pyridyl)-2H-chromen-5-ol.

References Cited
FOREIGN PATENTS
2,269   9/1968   Republic of South Africa
260—297 B ALAN L. ROTMAN, Primary Examiner U.S. Cl. X.R.
260—295 F, 295 CA, 296 B; 424—263, 266